United States Patent [19]

Davis et al.

[11] 3,735,240

[45] May 22, 1973

[54] INTEGRATED CIRCUIT CURRENT REGULATOR WITH DIFFERENTIAL AMPLIFIER CONTROL

[75] Inventors: William F. Davis, Tempe; Ronald W. Russell, Scottsdale, both of Ariz.; Thomas M. Frederiksen; Ernest L. Long, both of San Jose, Calif.

[73] Assignee: Motorola, Inc., Franklin Park, Ill.

[22] Filed: Oct. 15, 1971

[21] Appl. No.: 189,521

[52] U.S. Cl. ..........................323/4, 307/38, 323/25, 330/69

[51] Int. Cl. ..............................................G05f 1/56

[58] Field of Search........................307/297, 299, 38; 323/4, 17, 23, 25; 330/69

[56] References Cited

UNITED STATES PATENTS

| | | | |
|---|---|---|---|
| 3,417,319 | 12/1968 | Shaughnessy | 323/4 |
| 3,310,688 | 3/1967 | Ditkofsky | 323/4 UX |
| 3,414,803 | 12/1968 | Glasgow et al. | 323/4 |
| 3,555,402 | 1/1971 | Bozarth et al. | 323/4 |
| 3,603,894 | 9/1971 | Cecchin et al. | 330/69 X |
| 3,512,047 | 5/1970 | Garde | 323/4 X |

*Primary Examiner*—A. D. Pellinen
*Attorney*—Foorman L. Mueller, George Aichele and James W. Gillman et al.

[57] ABSTRACT

A current regulator for an automotive fuel injection system includes an integrated circuit chip having a differential amplifier with a control point to be coupled through an external impedance to the power supply. The differential amplifier drives a pair of Darlington connected transistors to control the current from the power supply to the load, which flows through the impedance. The collector electrodes of the Darlington transistors are connected to the control point, which is coupled to an input of the differential amplifier to form a closed negative feedback loop.

The transistors of the differential amplifier may have dual collector electrodes, and first and second Darlington pairs coupled thereto can control the current supplied to first and second loads. Switches are connected to the Darlington inputs for selectively enabling one output or the other.

10 Claims, 3 Drawing Figures

INTEGRATED CIRCUIT CURRENT REGULATOR WITH DIFFERENTIAL AMPLIFIER CONTROL

BACKGROUND OF THE INVENTION

For electronic control systems utilizing integrated circuits, such as fuel injection systems for internal combustion engines, timing is quite critical. Circuit timing in such systems may be accurately controlled by current applied to charge a capacitor. Consequently, it is necessary to provide very accurate current regulation of the charging supply.

Additional problems in maintaining an accurate current source are fluctuations due to variations in temperature and variations in the structural characteristic from unit to unit. In particular, 1 percent accuracy over a temperature range of from −55° C to 125° C is desirable for many applications, and cannot be provided unless precise current control is achieved. Further, this accuracy must be maintained over a large variable current range, i.e., 1 microamp to 1 milliamp. Also in some systems, the circuit must be capable of switching the current accurately from one output terminal to another.

SUMMARY OF THE INVENTION

It is an object of the present invention to provide a very accurate current regulator circuit which is capable of being programmed to supply very precise current.

It is another object of the present invention to provide a very accurate current regulator circuit which may be incorporated in an integrated circuit chip, and wherein individual chips have the same high accuracy.

It is a further object of the present invention to provide a very accurate current regulator operable to within 1 percent accuracy over a range of temperatures of from −55° C to 125° C.

It is a still further object of the present invention to provide a very accurate current regulator circuit which can be switched to selectively provide the same value of current to one of a plurality of output terminals.

Still another object of this invention is to provide a current regulator circuit which supplies current with precise accuracy over a very large current range (1 microampere to 1 milliampere for example), with the current being controlled by an external resistor to facilitate adjustment of the current value.

A current regulator provided on an integrated circuit semiconductor chip includes a differential amplifier having a control electrode, and a current controlling resistor external to the integrated circuit chip is coupled between this control electrode and the power supply. The differential amplifier includes a pair of PNP transistors with the emitters of both connected through a current source to the power supply, the base of the first transistor forming the control electrode, and the collector thereof being connected to reference ground potential. The base of the second transistor of the differential amplifier receives a reference voltage from a voltage divider connected to the power supply, and the collector of this transistor is coupled through a current source to ground potential. The collector of the second transistor is also connected to the input (base) of a Darlington pair which has the collectors coupled to the control terminal and the emitters coupled to the output terminal. A negative feedback circuit is therefore formed through the Darlington pair and the differential amplifier to provide precise output current control.

Another embodiment of the invention is essentially the same, except that both transistors of the differential amplifier have dual collectors, and two Darlington pairs are provided for controlling the output currents to two output terminals. The input electrode (base) of each Darlington pair is connected to a respective collector electrode of the second transistor (connected to the voltage divider) of the differential amplifier, and the junction there between is connected through a switch to ground. This acts to selectively disable one or the other of the two Darlington pairs to provide switched current regulation. The current regulator is constructed so that it can be incorporated in an integrated circuit chip and is particularly adapted to be used in an automotive fuel injection system.

DETAILED DESCRIPTION

Figure 1:
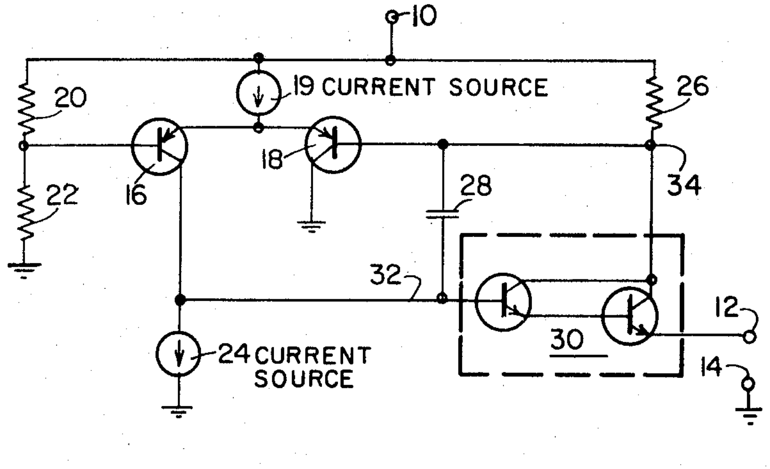
FIG. 1 is a schematic diagram of a simple form of the current regulator of the invention.

One circuit embodiment of the invention is illustrated in FIG. 1 of the drawings. In this circuit, terminal 10 is connected to an electrical supply such as that provided by a vehicle battery. The regulator circuit provides a regulated current from the supply 10 to an output terminal 12, adapted to be connected to a load. The load will be connected between the terminal 12 and ground or reference terminal 14 to which the other side of the power supply is connected.

The regulator circuit includes a differential amplifier formed by transistors 16 and 18, which are of the same conductivity type (PNP). The emitters of the two transistors are connected through a current source 19 to the supply terminal 10. A voltage divider including resistors 20 and 22 is connected between the supply line 10 and ground potential, and provides a reference voltage at the junction between resistors 20 and 22 which is connected to the base of transistor 16. The collector of transistor 16 is connected to ground potential through current source 24, and the collector of transistor 18 is directly connected to ground.

Current from the supply 10 flows through resistor 26 and current control circuit 30 to the output terminal 12. The junction between resistor 26 and the current control circuit 30 forms the control terminal 34 for the differential amplifier, and is coupled to the base of transistor 18. The current control circuit 30 includes a pair of NPN transistors connected as a Darlington pair. The Darlington pair is controlled by the signal on conductor 32, which is connected to the collector of transistor 16. A capacitor 28 may be bridged between conductor 32 and terminal 34 to prevent oscillation of this closed loop negative feedback circuit.

The differential amplifier responds to the potential at control point 34, which depends upon the current through the resistor 26, and to the reference potential which is applied to the base of transistor 16, to control the conductivity of transistor 16. The differential amplifier acts to maintain the voltage at control point 34, coupled to the base of transistor 18, the same as the voltage at the base of transistor 16. This action is provided by control of the Darlington pair 30, so that the current is applied through resistor 26 to provide a voltage drop thereacross to bring the voltage at control point 34 to the reference voltage applied to the base of transistor 16. The current at output terminal 12 will accurately follow the current through resistor 26, as the base current in conductor 32, and the base current of transistor 18, are insignificant as compared to the output current. Since these base currents are insignificant, variations thereof with temperature are also insignificant. The current sources 19 and 24 are selected so that the source 19 provides twice as much current as source 24, and the currents through transistors 16 and 18 will be the same when the differential amplifier is balanced. This cancels the voltage-temperature coefficients of the transistors, so that the voltage at control point 34 is independent of temperature.

The regulator circuit can be used to provide a wide range of currents from as little as 1 microampere to as much as 100 milliamperes. The lower limit is set by the base current of transistor 18 as compared to the output current, and the upper limit is reached because to provide large base drive to the Darlington pair will cause significant unbalance of the differential amplifier to produce an undesirable temperature response. The circuit described precisely controls the output current, the accuracy being the same from one integrated circuit to another and being independent of temperature.

The transistors 16 and 18 of the differential amplifier, the transistors of the Darlington pair, and the current sources 19 and 24, which may also include one or more transistors and/or diodes, can all be provided on a single integrated circuit chip. Resistors 20 and 22 and the required interconnections between the components can also be provided on the chip. This will cause matching of the transistors of the differential amplifier so that they are effective to balance out variations in temperature to which the circuit may be subjected. The circuit provides a very accurately regulated current output determined strictly by the voltage at the control terminal 34 which is, in turn, controlled by the value of resistor 26. The current loss through the Darlington pair and the current through the base of transistor 18 can be much less than 1%, to further contribute to the accuracy.

Figure 2:
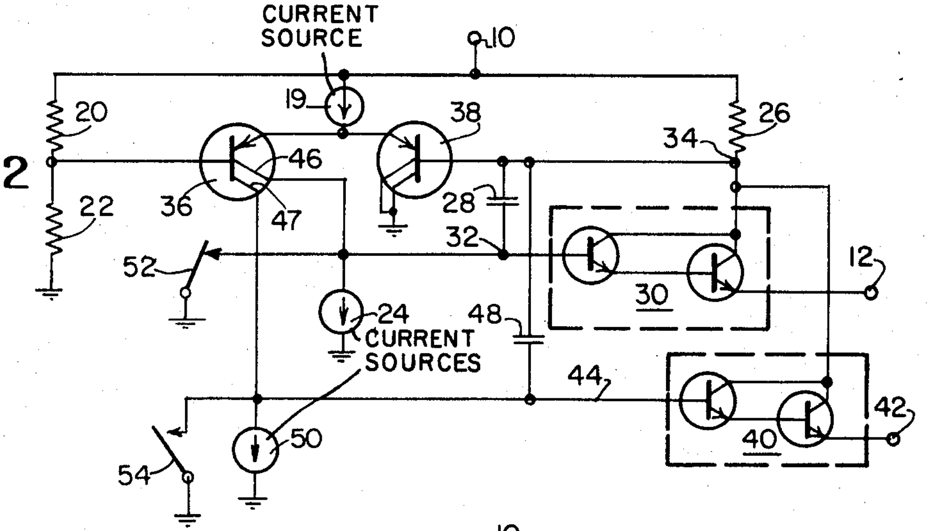
FIG. 2 is a schematic diagram of another embodiment of the present invention.

A second embodiment of the invention is shown in FIG. 2, which is the circuit diagram of a current regulator which provides current at either one of two outputs. The circuit is similar to the circuit of FIG. 1 and the same reference numerals will be used for like parts. The differential amplifier is formed by transistors 36 and 38, each of which includes two collector electrodes. Electrodes 46 and 47 of transistor 36, for example, divide the collector current. Although the two collector electrodes of transistor 38 are connected together and to ground potential, two collectors are provided to match transistor 36. Collector electrode 46 of transistor 36 is connected to the current source 24, as in FIG. 1, and to the input of the Darlington pair 30 which controls the current through output terminal 12, as described previously. The second collector 47 of transistor 36 is connected to current source 50, and by conductor 44 to the input of Darlington pair 40 which controls the current through output terminal 42. The collectors of the Darlington pair 40 are connected to the control terminal 34, which is connected to the base of transistor 38, as before. Capacitors 28 and 48 maintain frequency stability to keep the negative feedback circuit from oscillating, as described for capacitor 28 of FIG. 1.

The circuit of FIG. 2 is adapted to be switched to selectively control the current supplied through output terminals 12 and 42. This switching is provided by switches 52 and 54 connected across the current sources 24 and 50, respectively. When a switch is closed, the collector of transistor 36 to which it is connected is grounded, so that the base drive to the associated Darlington pair is eliminated. This provides an open circuit at the appropriate output terminal. In the circuit of FIG. 2, switch 52 is shown closed so that the circuit to output terminal 12 is open. The switch 54 is open so that Darlington pair 40 is operative to control the current supplied through output terminal 42. The currents, which are precisely controlled by resistor 26, will be identical in value at terminals 12 and 42, with the variations being less than 1%. This results from the fact that the base current errors in conductors 32 and 44 are negligible with respect to the desired output current.

Figure 3:
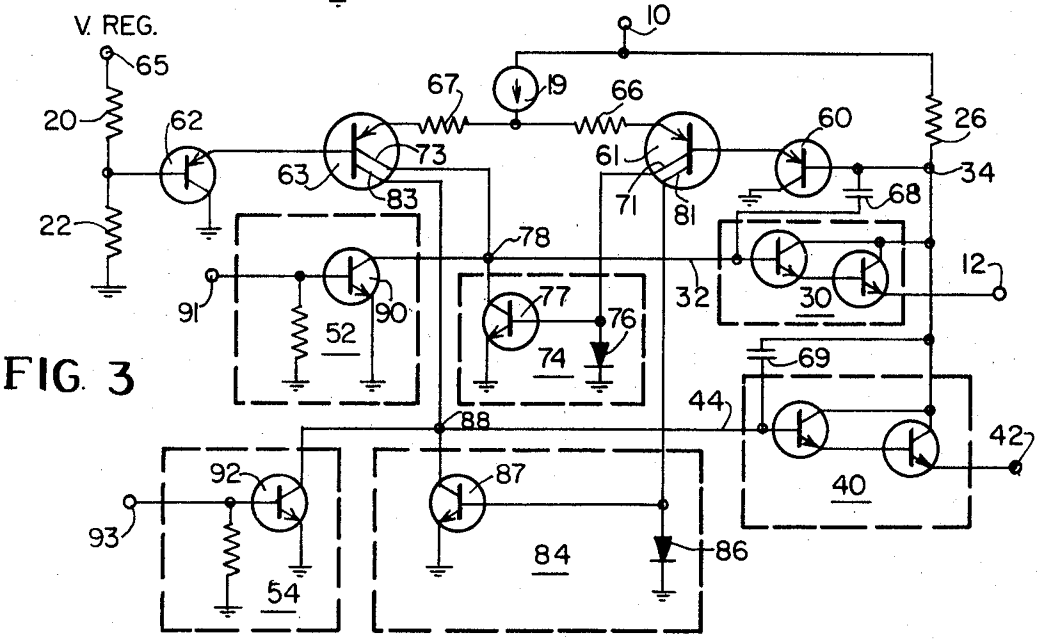
FIG. 3 is a more detailed schematic diagram of substantially the same circuit as that of FIG. 2.

FIG. 3 shows the circuit of the invention in greater detail and includes additional components and some circuit variations. The circuit is adapted to be incorporated on an integrated circuit chip. For purposes of explanation, parts which are shown in FIGS. 1 and 2 are given like numbers.

In the circuit of FIG. 3, each side of the differential amplifier includes a pair of Darlington connected transistors with transistors 60 and 61 forming the side connected to the control terminal 34, and transistors 62 and 63 forming the side connected to the voltage divider which provides the reference potential. This Darlington connection is important to insure that the base current of transistor 60 is insignificant with respect to the desired output current. In this embodiment the voltage divider is connected to a regulated supply 65 rather than to the potential supply 10 from which current is drawn. The transistors 60 and 62 are single collector PNP transistors, and transistors 61 and 63 are multi-collector PNP transistors, which may be of the same construction as the transistors 36 and 38 in FIG. 2.

The emitters of transistors 61 and 63 are connected to the supply potential line 10 through current source 19 and resistors 66 and 67. The collectors 71 and 73 of transistors 61 and 63, respectively are connected to a turn around circuit 74 which includes diode 76 and NPN transistor 77. The collector 71 of transistor 61 is connected to ground through diode 76, and the collector 73 of transistor 63 is connected to ground through the emitter-collector path of transistor 77. The diode 76 and transistor 77 may be constructed as part of an integrated circuit with the other transistors, and are matched so that the current through diode 76 biases transistor 77 to conduct the same current through its collector-emitter path. Therefore, when transistors 61 and 63 are conducting at the same level, the same currents flow through diode 76 and transistor 77 and there is no current at the junction point 78 between the collector 73 and the collector of transistor 77.

Normally the differential amplifier is slightly unbalanced so that small drive current is applied from point 78 to the input of the Darlington pair 30 to cause the same to conduct and supply the output current. When the voltage at control point 34 connected to the base of transistor 60 is lower than the reference voltage applied to the base of transistor 62, the transistor 61 conducts more than transistor 63, and the current through collector 71 of transistor 61 will flow through diode 76, which will render transistor 77 conductive to supply the same current. Since this current is more than the current flowing through collector 73 of transistor 63, transistor 77 will saturate and current will not be available through conductor 32 to the input of the Darlington pair 30. This will decrease the output current at terminal 12 until the base voltage at transistors 60 and 62 are identical, at which point the current in collectors 71 and 73 are identical. Likewise, if the voltage at the base of transistor 60 is greater than that at the base of transistor 62, more current flows in collector 73 than in collector 71. As a result, the current in the collector of transistor 77 is less than that in collector 73, which forces base current into conductor 32 increasing the current to terminal 12 until, again, the base voltages of transistors 60 and 62 are identical. In this manner, the amplifier regulates the output current.

The second collector 81 of transistor 61 and the second collector 83 of transistor 63 are connected to a second turn around circuit 84. This includes diode 86 and NPN transistor 87 which operate in the same manner as diode 76 and transistor 77 of the circuit 74. This controls the current at point 88, which is connected by conductor 44 to the input of the Darlington pair 40 to control the current at output terminal 42, as previously described.

The switches 52 and 54 for selecting the output terminal to which current is supplied are shown in FIG. 3 as transistor switches. Switch 52 includes transistor 90 which is rendered conducting by the potential applied at terminal 91. Switch 54 includes transistor 92 which is rendered conducting by the potential applied at terminal 93. Control potentials may be applied to terminals 91 and 93 to selectively render the current regulator operative to control the current supplied to terminals 12 and 42 for various different applications. When either transistor 90 or 92 is conductive, it routes all the available current, at points 78 or 88, respectively, to ground. This eliminates base drive to the associated Darlington pair thus eliminating output current to terminals 12 or 42, respectively.

One application in which this system has been used is a fuel injector system for internal combustion engines wherein the injector valves are divided into two banks which are selectively rendered operative. The currents at output terminals 12 and 42 are used to selectively charge two capacitors in the system.

The circuit of FIG. 3 can also be constructed as an integrated circuit with all the transistors and diodes provided on a single chip. Resistors 20, 22, 66 and 67 can also be provided on the integrated circuit chip, with resistor 26 being external to the chip and selected to provide the amount of current required for a particular application. Capacitors 68 and 69 may also be external to the chip, and act to keep the negative feedback circuit from oscillating. These capacitors provide action generally the same as capacitor 28 shown in the circuit of FIG. 1. Resistors 67 and 66 are employed to decrease the open loop gain of the amplifier, thereby allowing good frequency compensation with compensation capacitors 68 and 69 which have small value.

The current regulator which has been described has been found to operate effectively to provide a very precisely controlled current. The circuit acts to control the current so that there is no significant change with temperature. The regulator can be constructed as an integrated circuit, and the response is very accurately the same from one unit to the next. The current controlling resistor can be provided external of the integrated circuit so that the same chip can be used to control currents over a wide range of currents.

We claim:

1. A current regulator circuit for maintaining constant output current from a power supply to an output terminal, including in combination, impedance means and a current control device connected in series between the power supply and the output terminal, said current control device including a pair of transistors connected in a Darlington circuit with a control terminal connected to the base electrode of one of the transistors;

first and second transistors of the same conductivity type forming a differential amplifier, each transistor having control, common and output electrode means;

first current source means coupling said common electrode means of each of said first and second transistors to the power supply;

reference means coupled to said control electrode means of said first transistor to provide a substantially fixed bias therefor;

means coupling said control electrode means of said second transistor to the junction between said impedance means and said control device;

means coupling said output electrode means of said second transistor to ground potential;

second current source means connected between said output electrode means of said first transistor and ground potential, said second current source means constructed to conduct current of a value one-half that of the current provided by said first current source means;

means coupling said output electrode means of said first transistor to said control terminal to thereby control the current supplied by said current control device to the output terminal; and a frequency compensation capacitor coupled between said control electrode means of said second transistor and said output electrode means of said first transistor to maintain frequency stability.

2. A current regulator circuit provided on an integrated circuit chip for maintaining constant output current over a wide range of temperatures and currents, and which has a control terminal adapted to be connected to impedance means connected to a direct current power supply for supplying current therefrom, such regulator circuit including in combination:

first and second power supply terminals for connection to the direct current power supply;

a differential amplifier having first and second transistors of the PNP type, each of said transistors having control, common and output electrode means;

means including first current source means coupling said common electrode means of said first and second transistors to said first power supply terminal;

reference means coupled to said control electrode means of said first transistor for providing a reference potential thereto;

means coupling said control electrode means of said second transistor to the control terminal;

current control means coupling an output terminal means to the control terminal;

means including second current source means coupling said output electrode means of said first transistor to said second power supply terminal, said second current source means constructed to conduct current of a value one-half that of the current provided by said first current source means; and means coupling said output electrode means of said first transistor to said current control means, said current control means controlling the current supplied to said output terminal means in accordance with the current supplied thereto from said first transistor.

3. A current regulator circuit in accordance with claim 2 including capacitor means external to the integrated circuit chip coupled between the control terminal and said output electrode means of said first transistor to maintain frequency stability.

4. A current regulator circuit according to claim 2 wherein said current control means includes a pair of transistors connected as a Darlington pair.

5. A current regulator circuit according to claim 2 wherein said differential amplifier includes a third transistor coupling said reference means to said control electrode means of said first transistor, and a fourth transistor coupling the control terminal to said control electrode means of said second transistor.

6. A current regulator circuit for maintaining constant output current from a power supply to first and second output terminals, including in combination, impedance means connected to the power supply;

first and second current control devices connected respectively between said impedance means and said first and second output terminals;

first and second transistors of the same conductivity type forming a differential amplifier, each transistor having control, common and output electrode means, said output electrode means of said first transistor including first and second output electrodes;

means coupling said common electrode means of each of said first and second transistors to the power supply;

reference means coupled to said control electrode means of said first transistor to provide a substantially fixed bias therefor;

means coupling said control electrode means of said second transistor to the junction between said impedance means and said control devices;

means coupling said output electrode means of said second transistor to ground potential; and means coupling said first and second output electrodes of said first transistor to said first and second current control devices, respectively, to thereby control the current supplied to the first and second output terminals.

7. A current regulator circuit in accordance with claim 6 further including first and second switch means, said first switch means being coupled between first output electrode and ground potential, and said second switch means being coupled between said second output electrode and ground potential.

8. A current regulator circuit provided on an integrated circuit chip for maintaining constant output current over a wide range of temperatures and currents, and which has a control terminal adapted to be connected to impedance means connected to a direct current power supply for supplying current therefrom, such regulator circuit including in combination:

first and second power supply terminals for connection to the direct current power supply;

a differential amplifier having first and second transistors of the PNP type, each of said transistors having control, common and first and second output electrodes;

means including first current source means coupling said common electrode means of said first and second transistors to said first power supply terminal;

reference means coupled to said control electrode means of said first transistor for providing a reference potential thereto;

means coupling said control electrode means of said second transistor to the control terminal;

first and second control circuits coupled between said first and second output electrodes and first and second output terminals, respectively, said control circuits coupling said first and second output terminals with the control terminal;

means including second and third current source means coupling said first and second output electrodes, respectively, of said first transistor to said second power supply terminal;

first and second switch means coupled between said respective first and second output electrodes of said first transistor and said second power supply terminal; and means coupling said first and second output electrodes of said first transistor to said first and second current control means, respectively, said first and second current control means controlling the current supplied to said output terminals in accordance with the current supplied thereto from said first transistor.

9. A current regulator circuit according to claim 8 wherein each of said control circuits includes a pair of transistors connected as a Darlington pair.

10. A current regulator circuit according to claim 8 wherein each of said switch means includes a transistor connected to shunt the current from one of said output electrodes of said first transistor to said second power supply terminal.

* * * * *